(12) United States Patent
Uttamchandani et al.

(10) Patent No.: US 8,352,593 B2
(45) Date of Patent: Jan. 8, 2013

(54) SYSTEM AND METHOD FOR PROVIDING AUTONOMIC MANAGEMENT OF A NETWORKED SYSTEM FOR USING AN ACTION-CENTRIC APPROACH

(75) Inventors: Sandeep Madhav Uttamchandani, San Jose, CA (US); Kaladhar Voruganti, San Jose, CA (US); Sudarshan M. Srinivasan, Champaign, IL (US); David Allan Pease, Redwood Estates, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/764,865

(22) Filed: Apr. 21, 2010

(65) Prior Publication Data

US 2010/0205133 A1 Aug. 12, 2010

Related U.S. Application Data

(62) Division of application No. 10/737,519, filed on Dec. 15, 2003, now Pat. No. 7,734,561.

(51) Int. Cl.
G06F 15/173 (2006.01)
G06F 17/00 (2006.01)

(52) U.S. Cl. .......................................... 709/224; 706/50

(58) Field of Classification Search .......... 709/201–226; 706/46–101; 707/675–694
See application file for complete search history.

(56) References Cited

U.S. PATENT DOCUMENTS 7,469,409 B2 * 12/2008 Donatelli et al. ............. 719/316
7,664,798 B2 * 2/2010 Wood et al. ................... 707/649
2002/0059427 A1 * 5/2002 Tamaki et al. ................ 709/226
2003/0225801 A1 * 12/2003 Devarakonda et al. ....... 707/205
2004/0148138 A1 * 7/2004 Garnett et al. ................ 702/189
2004/0181794 A1 * 9/2004 Coleman et al. ............. 718/104

OTHER PUBLICATIONS

Ganger et al. "Self-Storage: Brick-based storage with automated administration", Carnegie Mellon University Technical Report CMU-CS-03-178, Aug. 2003).*
Ward et al. "Appia: automatic storage area network fabric design", Conference on File and Storage Tech. (FAST '02), pp. 203-217, Jan. 2002.*
Executive Tek Report, "Autonomic Computing 2: Implications for IT Services", IBM Global Services, Apr. 2002.*

* cited by examiner

Primary Examiner — Joseph Avellino
Assistant Examiner — Mark O Afolabi
(74) Attorney, Agent, or Firm — GSS Law Group

(57) ABSTRACT

According to the present invention, there is provided a SAN management system to provide autonomic management of a storage system using an action-centric approach. The SAN management system includes a policy specification logic block to maintain a policy specification associated with the managed system. In addition, the SAN management system includes a reasoning logic block to provide for the determining of action rules using a combination of logic and information obtained from the policy specification. Also, the SAN management system includes a learning logic block to couple the policy specification logic block with the reasoning logic block to improve an understanding of a managed system. The learning is continuous and provides for autonomic evolvement of the system in which reliance on manual input from a user is lessened.

5 Claims, 8 Drawing Sheets

SYSTEM AND METHOD FOR PROVIDING AUTONOMIC MANAGEMENT OF A NETWORKED SYSTEM FOR USING AN ACTION-CENTRIC APPROACH

CROSSREFERENCE TO RELATED APPLICATIONS

This application is a divisional of U.S. patent application Ser. No. 10/737,519 filed Dec. 15, 2003, which is incorporated herein in its entirety.

FIELD OF THE INVENTION

The present invention relates to the field of Networked systems management, and more specifically, to a system and method for providing autonomic management of a networked system.

BACKGROUND

Complexity and brittleness are present problems in the run-time behavior management within a storage system. Complexity arises from the level of details required to specify policies. These details are non-trivial and require a thorough understanding and expertise of the system internal. More precisely, it is difficult for administrators and system builders to choose which combination of system parameters to observe from a large set of possible observables; determine appropriate threshold values after considering the interaction of a large set of system variables; and select a specific corrective action from the large set of competing options. As the number of users, storage devices, storage management actions and service level agreements increase, it becomes computationally exhaustive for a system administrator and storage management tool developers to consider all the alternatives.

With regards to brittleness, it is difficult for vendors to provide pre-packaged transformation code within their products because this code becomes brittle with respect to changing system configurations, user workloads and department/business constraints. Thus, it is difficult for the storage management vendors to envision all of the potential use case scenarios ahead of time, and thus, many of the current storage management solutions provide workflow environments which, in turn, pass the responsibility of transforming high level QoS goals (via workflow scripts) to an organization's system administrators and infra-structure planners.

What is needed is a solution which provides for autonomic management in storage systems, in which the resulting problems associated with complexity and brittleness are overcome.

SUMMARY OF THE INVENTION

According to the present invention, there is provided a network management system to provide autonomic management of a networked system using an action-centric approach. The network management system includes a policy specification logic block to maintain a policy specification associated with the managed system. In addition, the network management system includes a reasoning logic block to provide for the determining of action rules using a combination of logic and information obtained from the policy specification. Also, the network management system includes a learning logic block to couple the policy specification logic block with the reasoning logic block to improve an understanding of a managed system. The learning is continuous and provides for autonomic evolvement of the system in which reliance on manual input from a user is lessened.

DETAILED DESCRIPTION

The invention will be described primarily as a system and method to provide autonomic management in a storage system, using an action-centric approach. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
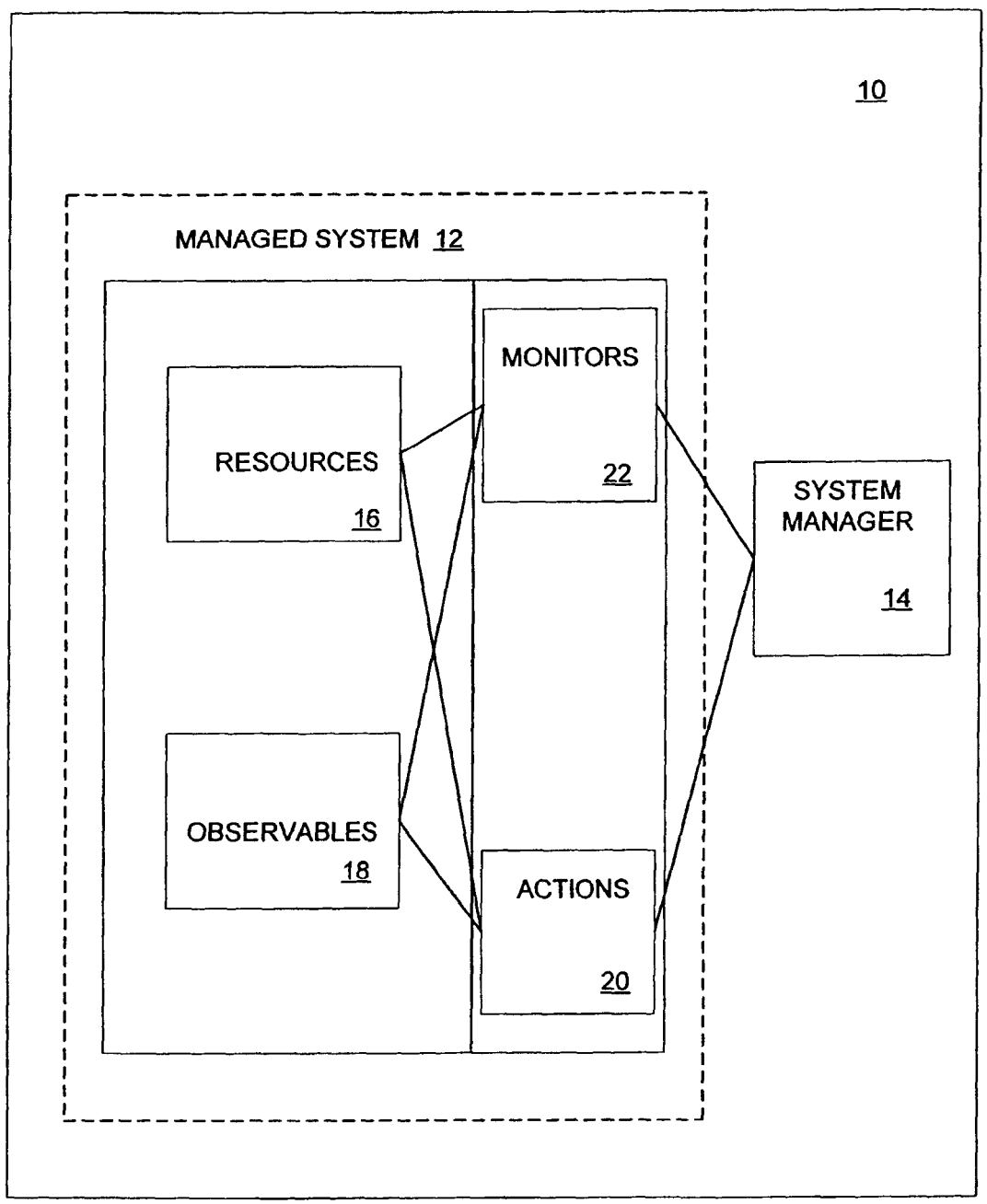
FIG. 1 is a block diagram of a system model in which autonomic management of a storage system using an action-centric approach is provided, according to an exemplary embodiment of the invention.

FIG. 1 illustrates a system model 10 to provide autonomic management of a storage system 12 using an action-centric approach, according to an exemplary embodiment of the invention.

System model 10 includes system manager 14. System manager 14 provides for tuning the managed system 12 according to the goals specified by an administrator.

Managed system 12 includes a set of Resources <R> 16, which are used to service requests from applications. Examples of resources 16 include the processor, network, memory and storage. Also, the managed system 12 includes, a set of Observables <O> 18. The set of observables 18 represent the properties (e.g., throughput, latency, reliability, availability, security) of the managed system 12 as visible to the application. The Goals of the managed system 12 are expressed as thresholds on the values of <R> 16 or <O> 18.

A stream of incoming requests to managed system 12 can be characterized along several dimensions. For example, in a storage system, typical dimensions are the read/write ratio, the access pattern (sequential/random), the block size of requests, etc. In the exemplary embodiment, the capturing of information along various dimensions (e.g., block size of requests, etc.) is utilized to determine the Workload characteristics <W> of the incoming stream.

To achieve goals associated with managed system 12, system manager 14 either invokes services or tunes configuration parameters within managed system 12 as a result of status information (e.g., workload characteristics, resource information from resources 16, observables information from observables 18, etc.) received from monitors 22. The service invocations and parameter changes define the set of adaptive actions <A> 20 that managed system 12 can perform.

Figure 2:
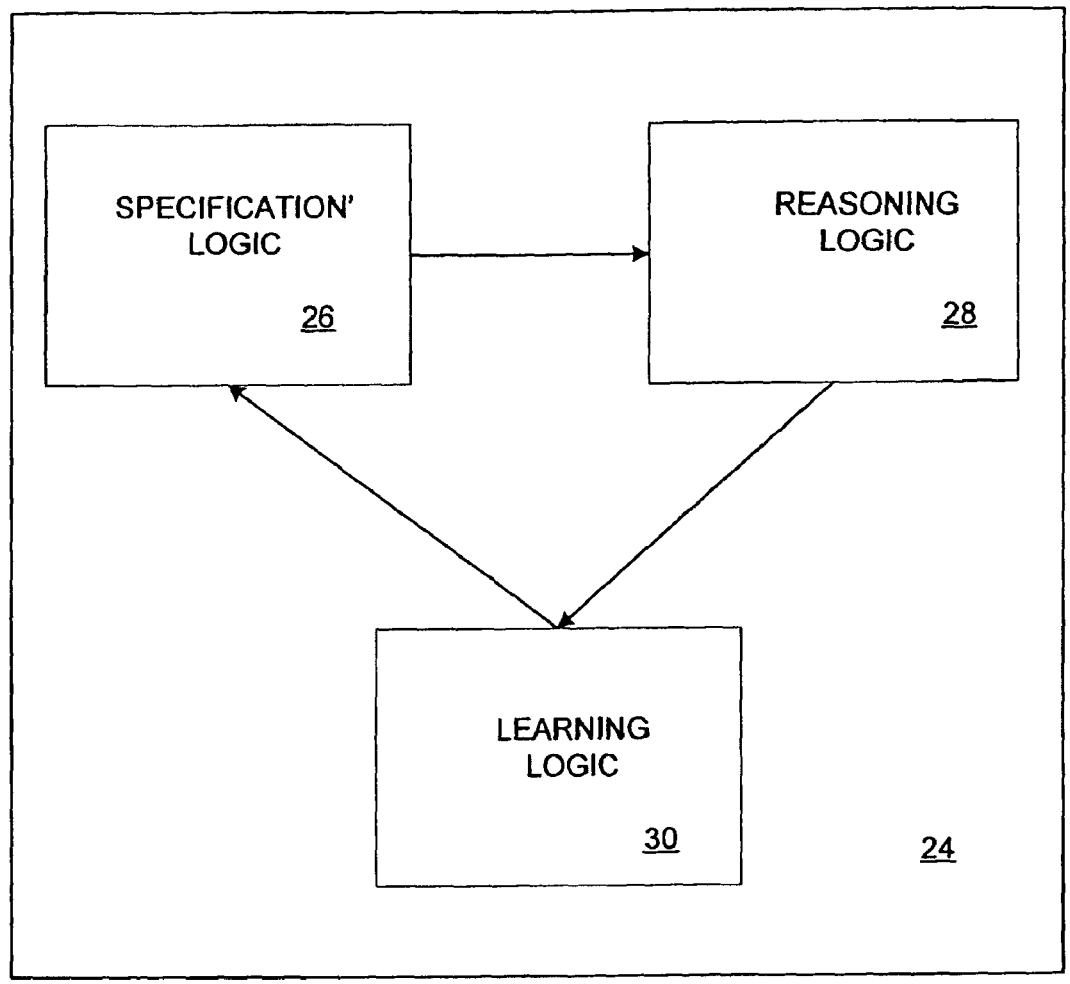
FIG. 2 is a block diagram of the logical blocks included within a system manager, wherein the system manager is utilized to dynamically manage a computer system's behavior, according to an exemplary embodiment of the invention.

In an exemplary embodiment, actions <A> 20 are first-class entities. They have an impact on behavior dimensions, including resources 16 and observables 18. The quantitative effect of an action depends on current workload characteristics, resource utilization levels and observable values in managed system 12. Actions 20 have well-defined and standardized functions (based on SMI-S FIG. 2 is a block diagram 24 of the logical blocks included within a system manager 14, according to an exemplary embodiment of the invention. Block diagram 24 includes policy specification logic 26, reasoning logic 28 and learning logic 30.

Policy Specification

The policy specification logic 26 maintains a policy specification associated with managed system 12 is maintained. The policy specification can be made up multiple policies. A policy specification maintained by policy specification logic 26, according to an exemplary embodiment of the invention, treats actions as software-objects, and an administrator simply defines properties of actions (rather than the complex "how to" details of existing approaches).

The policy specification logic 26 provides an action-centric (in contrast to event-centric) approach, where actions 20 are represented as software objects. The policy specification defines attributes of these objects. The policy specification does not define how managed system 12 should react when goals are not met. Properties of actions 20 are defined, and by reasoning, system manger 14 derives the precise behavior on-the-fly.

In an exemplary embodiment, attributes of actions 20 fall under two categories, including meta attributes and base attributes.

Meta Attributes

Meta attributes allow system manager 14 to reason with regards to tradeoffs involved in choosing an action, and to decide which action to invoke among several available options in actions 20. Meta attributes provide information along two dimensions:

Effects of invoking the action; they are specified as a set of behavior implications. A behavior implication consists of a behavior impact vector that describes how the action impacts managed system 12 resources <R> 16 and/or observables <O> 18.

Preconditions upon which the "effectiveness" of the action depends. These are predicates in terms of workload conditions <W> or limits on resources <R> 16.

Base Attributes

This group of attributes specifies how exactly to invoke an action that has been chosen through the use of meta-attributes. This involves selecting the values of parameters to invoke the action with while conforming to restrictions on those values.

In addition, to the meta attributes category and the base specification category, the policy specification also includes certain exceptions.

TABLE 1

Template for Policy Specification of an Object

Action-object <A>
{
    [Observable Implications]    // Observable dimensions the action affects
    [Resource Implications]    // Resources that the action affects
    [Pre-conditions]    // Dependencies of the action on low-level state
        [Workload Dependency]
        [Resource Dependency]
    [Base Specification]    // Functions for invoking the action
    [Exception handling]    // Error-events
}

According to an exemplary embodiment of the invention, table 1 provides a template for the specification of an object in the policy specification.

TABLE 2

Policy specification grammar

```
specification := <entry> <specification> | <entry>
entry := <name> <behavior_implications> <preconditions> <usage>
name := <string-value>
resource := cpu | memory | network | storage
behavior_implications := <behavior_implication>
<behavior_implications> | <behavior_implication>
behavior_implication := <dimension> <impact>
impact := up | none
dimension := latency | throughput | reliability | availability
preconditions := <precondition> <preconditions> | null
precondition := <workload-characteristic> | <resource-precondition>
workload-characteristic := rw-ratio <rw-ratio-value> | access-pattern
<access-pattern-value> | request-block-size <integer-value-inclusive> |
request-rate <integer-value-inclusive>
rw-ratio-value := mostly-reads | mostly-writes | reads-writes | *
access-pattern-value := sequential | random | *
resource-precondition := <resource> <value>
value := <interval-value>| <list-value>
interval-value := <float-value> to <float-value> | <integer-value> to
<integer-value>
list-value := <list-value>*<list-item>
list-item := <float-value> | <integer-value>
integer-value-inclusive := <integer-value> | *
```

TABLE 3

Prefetch knob definition

```
<action name = prefetch>
    <behavior_implications>
        <implication dimension = memory impact = down>
        <implication dimension = storage impact = none>
    </behavior_implications>
    <preconditions>
        <precond dimension = access-pattern value = sequential>
        <precond dimension = memory value = 20-60>
    </preconditions>
</action>
```

Table 3 provides an exemplary definition of a prefetch know using the grammar of Table 2, according to an exemplary embodiment of the invention.

Reasoning

Reasoning logic 28 provides for the determining of action rules "on-the-fly" using a combination of logic and base attributes. System manager 14 is alert-driven, and invokes the reasoning procedure only when managed system 12 indicates that one or more goals are violated. Managed system 12 indicates violation of one or more goals through generating an alert. System manager 14 uses the knowledge base built based on the policy specification for reasoning and decides to invoke one or more actions 20 to bring managed system 12 back to a state in which all goals are met.

Figure 3A:
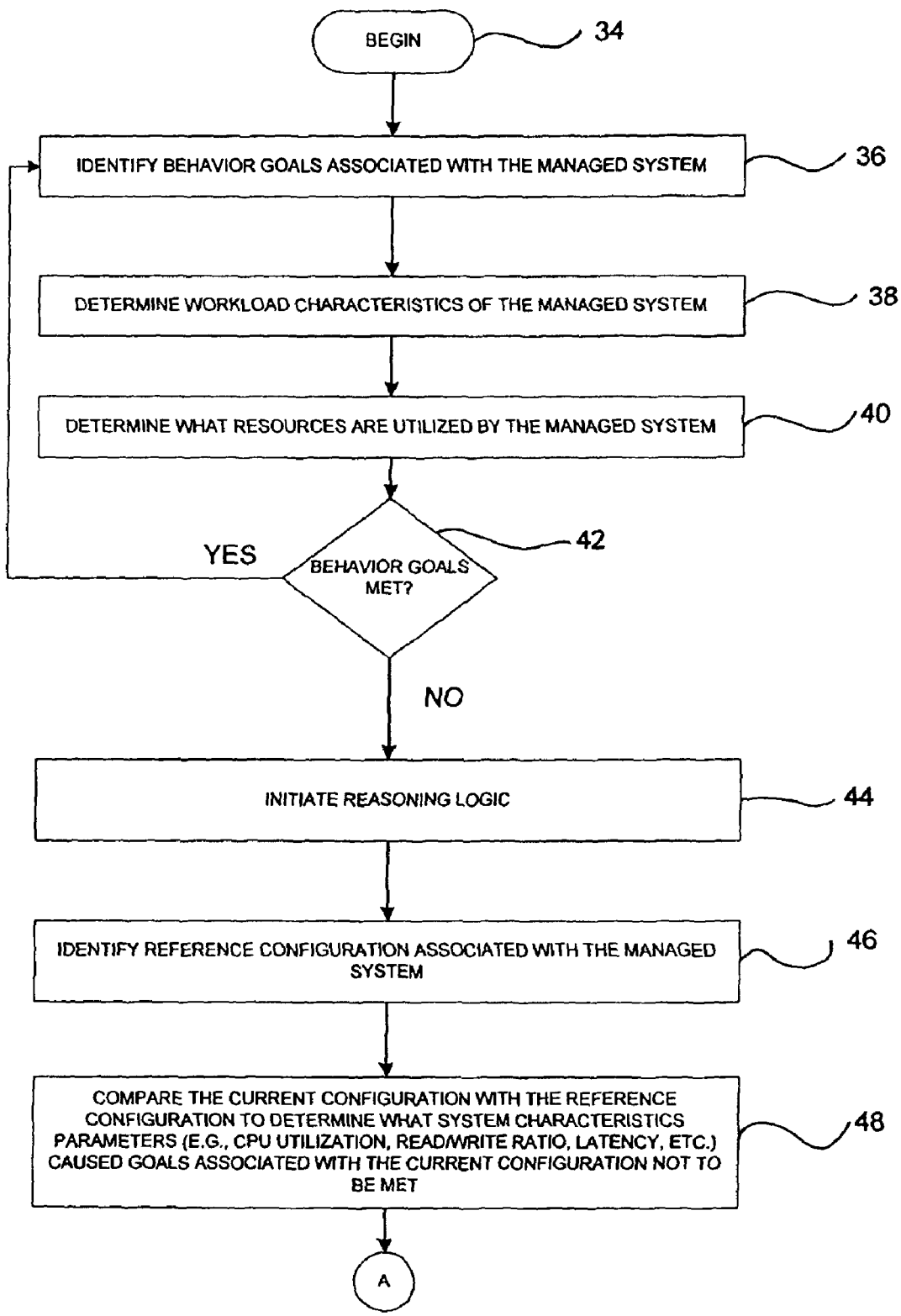
FIG. 3 is a method of performing reasoning within a system manager, according to an exemplary embodiment of the invention.
Figure 3B:
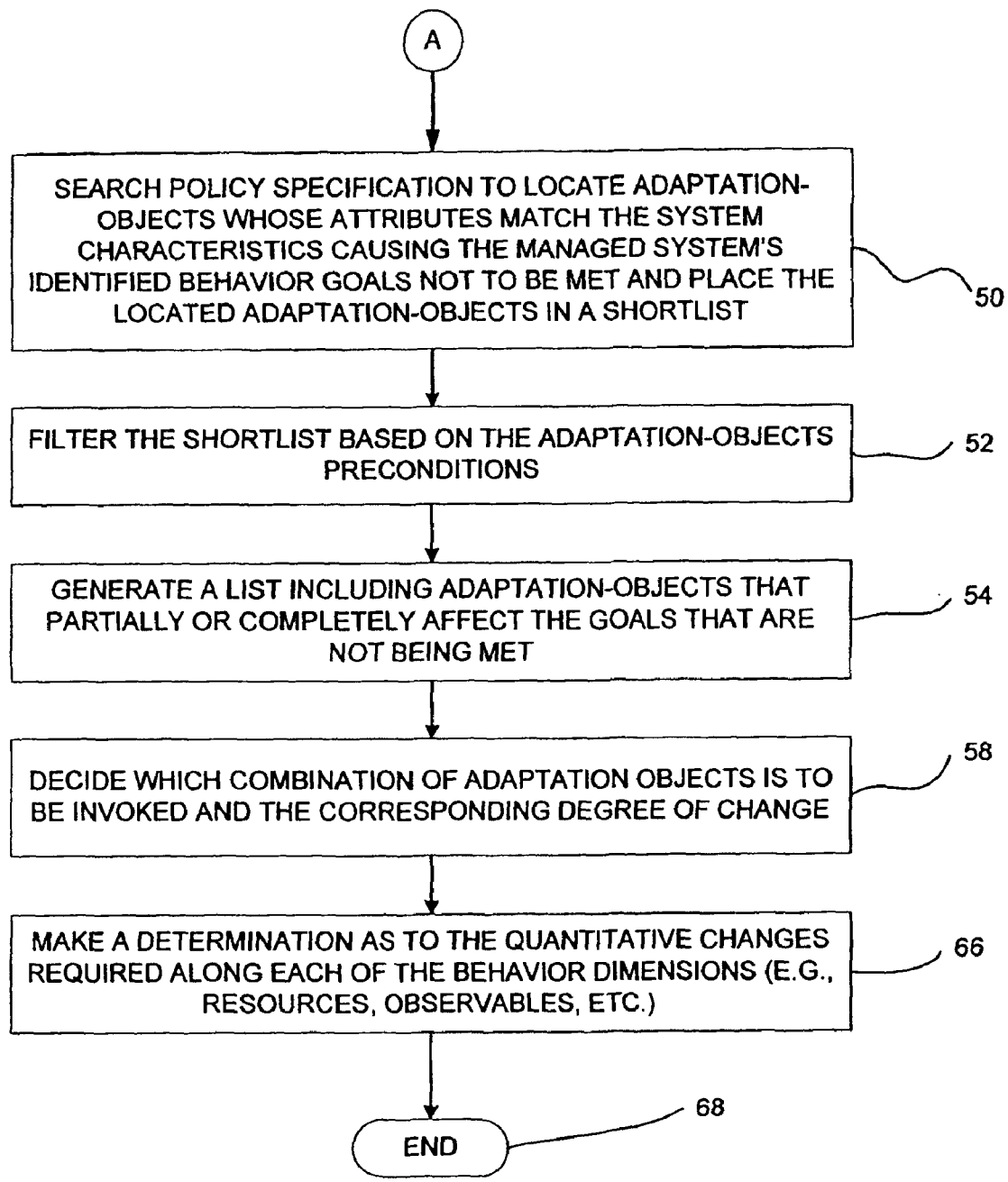

FIG. 3 is a method 32 of performing reasoning within the reasoning logic 28 of system manager 14, according to an exemplary embodiment of the invention. At block 34, method 32 begins.

At block 36, behavior goals associated with managed system 12 are identified. The behavior goals are specified by the Administrator responsible for running the system. These goals are similar to service level agreements (SLA) and define constraints on the observed behavior of managed system 12. Examples of behavior goals include: latency less than 5 msec, throughput greater than 100 MBPs, system down-time less than 5 minutes a year, etc.

At block 38, the workload characteristics of managed system 12 are determined.

At block 40, the resources utilized by managed system 12 are determined.

At block 42, a determination is made as to whether the behavior goals identified at block 36 are being met. If no, then method 32 returns to block 36.

Returning to block 42, if yes, then at block 44, a trigger initiating the reasoning logic 28 within system manager 14 is initiated.

At block 46, identify a reference configuration associated with managed system 12. The reference configuration is a previous configuration for managed system 12 in which the identified behavior goals (see step 36) were being met.

At block 48, compare the identified reference configuration with the current configuration of managed system 12 to identify the system characteristics (e.g., workload, resources, environment, goals, etc.) or combination of system characteristics caused the identified behavior goals (see step 36) not to be met. This comparison helps to provide understanding for change(s) at the behavior-level and state-level.

Examples of some system characteristics include, but are not limited to the following:

a. Resources utilization (percentage) [$c_1$]: This accounts for failures, resource-addition and application activity-bounds.

b. Application request-characteristics [$c_2$]

c. Assigned goals [$c_3$]

d. Environment [$c_4$]: This accounts for dependencies with other components within the system. This aspect is a part of future work as the current-work concentrates on stand-alone systems.

In most cases, the combined-effect of [$c_2$] & [$c_4$] will reflect in [$c_1$].

TABLE 4

System characteristic file-system parameters

Resources utilization (percentage) [$c_1$]
    Storage sub-system
    Network
    Memory
    CPU TABLE 4-continued System characteristic file-system parameters Application request-characteristics [$c_2$]
    Access-characteristics
        Request block size
        Request rate
        Skew/Locality
    Async operations
    Pathname translation operations
    Read/write ratio
Assigned goals [$c_3$]
    Throughput
    Latency
    Availability
    Security At block 50, the policy specification maintained by policy specification logic 26 is searched to locate adaptation-objects whose attributes match the system characteristics or combination of system characteristics identified at block 48. The search results in a shortlist of all the adaptation-objects that affect parameters in c1, c2 & c4.

The policy specification search is based on a simple table-based approach: For each of the parameters in c1, c2 & c4, the adaptation-objects are arranged in the form of a table (i.e. the objects that affect the desired set of resources, application-characteristics and environment). A join operation is used to select objects that affect parameters in two or more categories.

At block 52 the shortlist is filtered based on the adaptation-objects pre-conditions. Pre-conditions are the requirements on system-state and workload characteristics which ensure that the action will be effective (if invoked). For example, in the case of prefetch action, the preconditions are the workload being sequential and memory being available.

At block 54, a list including adaptation-objects that partially or completely affect the goals that are not being met, is generated.

Performing Higher-Order Operations on Actions

Figure 4:
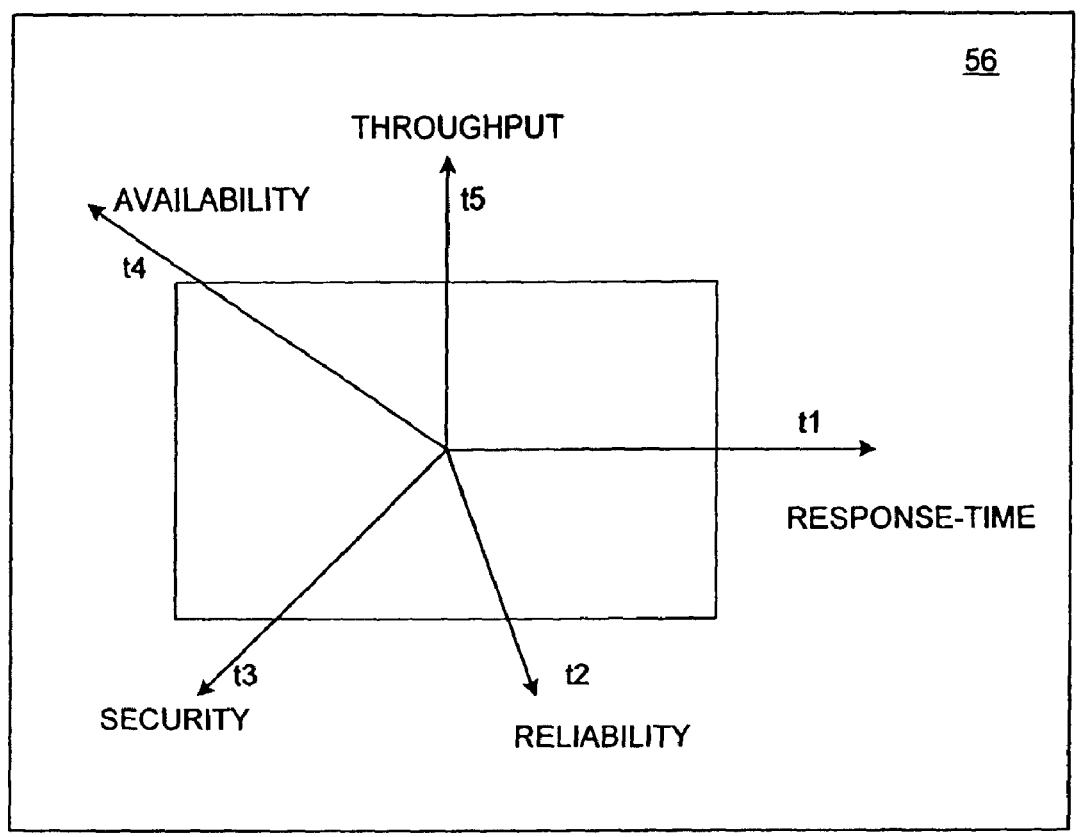
FIG. 4 illustrates an N-dimensional behavior space.

FIG. 4 illustrates an N-dimensional behavior space 56. The dimensions of goals (c3) is used to decide the combination of Adaptation-objects that needs to be invoked and their corresponding degree change.

Returning to FIG. 3, at block 58 a decision as to the combination of adaptation-object that need to be invoked and their corresponding degree change, is made. The shortlist adaptation objects and an estimate of the behavior dimensions affected, are provided to the dimension of goals (c3) (See FIG. 4 above). The behavior dimensions are derived by a combination of the policy specification content and self-learning.

The operations within block 58, can be explained in terms of vector-space operations. The vector space represents an n-dimensional behavior space as shown in FIG. 4. Each adaptation-object is represented as a unit vector, within an n-dimensional behavior space. The direction of the vector is an estimate of the behavior dimensions that it affects. The length signifies degree change for the base-invocation of the adaptation-object.

A determination is made as to the combination of the unit vectors (see FIG. 4) and their associated length.

Figure 5:
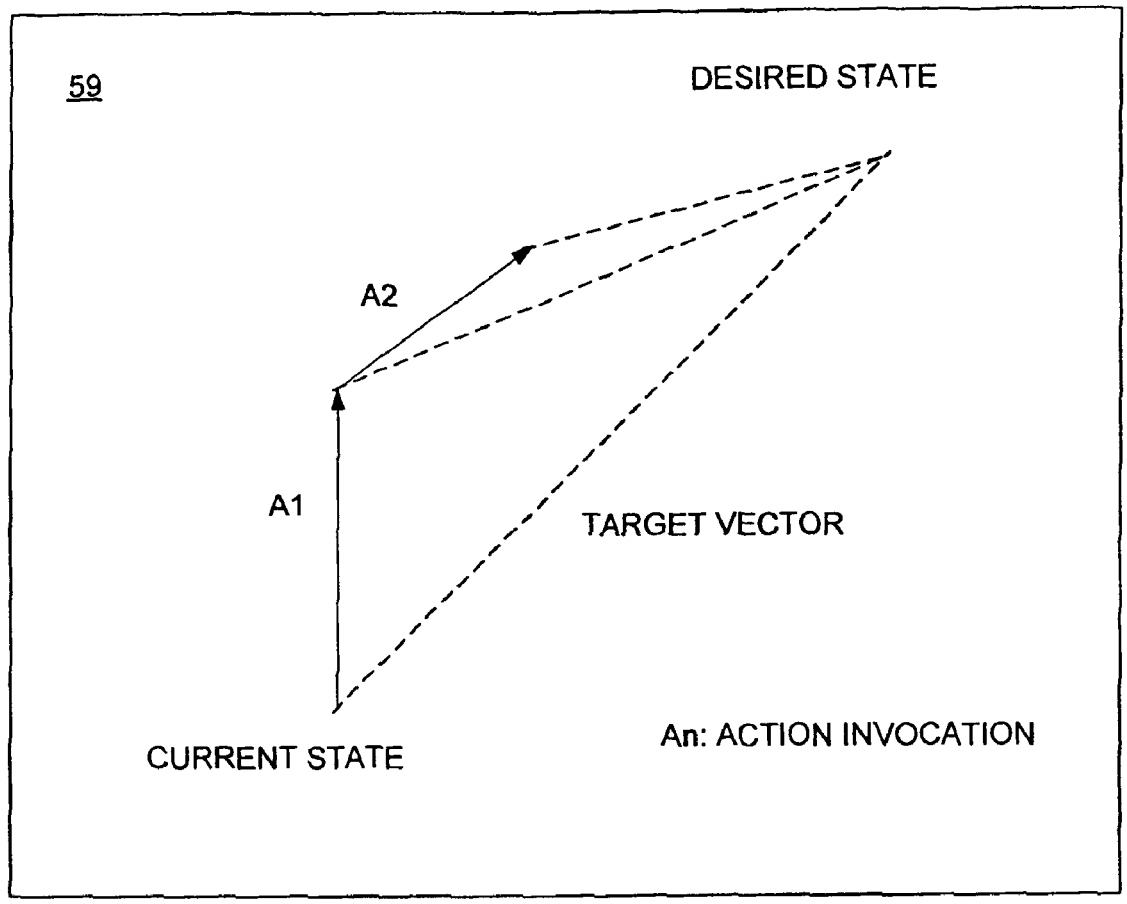
FIG. 5 shows vector addition based on Blackwell's theorem, where a recursive algorithm based on Blackwell's theorem is utilized to combine vectors.

FIG. 5 is a diagram 59 showing vector addition based on Blackwell's theorem, where a recursive algorithm based on Blackwell's theorem is utilized to combine vectors.

A target vector 60 starting from the current-state 62 to the desired-state 64, is generated.

The unit vector whose cosine angle with the target vector 60 is greatest, is selected. The step size of the vector is k, where 'k' signifies the degree of instability of the system. (k<the length of target vector). Repeat the generation of the target vector 60 and the selection of the unit vector whose cosine angle with the target vector is greatest. In the exemplary embodiment, the steps of repeating the generation of the target vector are repeated until the unit vector (with step size k) equals the target vector. During each iteration the algorithm is selecting the best possible action for the given state (e.g., local optimization based on the current state).

Using the Base Specification to Decide on How to Invoke the Action

At block 66, once a decision has been made as to which one or more actions to invoke, a determination is made as to the quantitative changes required along each of the behavior dimensions (resources and observables). An incremental approach is utilized to decide what parameter values to set for the action. For example, the action with a unit change of parameter value in one direction is invoked. If the implications of this step are as expected, then the action is repeatedly invoked, with increasing values of the parameter until the system reaches a satisfying state. If not, then direction of change to the action parameter value is reversed and the actions within block 66 are repeated.

Thus, the reasoning module is invoked when the system indicates that one or more goals of managed system 12 have been violated.

At block 68, method 32 ends.

Learning

Returning to FIG. 2, learning logic 30 provides a methodology for coupling learning with policy specifications (policy specification logic 26) and reasoning (reasoning logic 28). Learning logic 30 is utilized to refine the knowledge base with measured values and thresholds. Existing approaches, such as those for machine-learning (e.g., neural networks, decision trees, K-NN, etc.) are leveraged. The existing approaches have been used for classification and are used here to learn from responses to earlier decisions.

Learning is systematically done at multiple levels, including a meta specification level (see meta attributes above), a base specification level (see base attributes above), a level covering relations between actions and a level in which learning from the administrator is achieved.

Meta Specification Level

An administrator may provide incomplete or imprecise information regarding the implications of an action. For instance, they may fail to specify values of one or more precondition dimensions for which the action does not have the mentioned impact. The system learns during regular operation about these additional preconditions, and modifies the policy specification accordingly.

As another instance of learning, the framework allows the administrator to specify hints that would guide the system in reasoning. For instance, in the scenario where more than one action may be invoked in order to correct the system's state, the administrator could specify (based on their prior experience) which action to invoke under specific workload conditions. This can be implemented by using a decision tree to specify workload conditions, where the leaves of the tree contain the administrator's choice of action to invoke.

Base Specification Level

The system can learn from incremental invocation. In order to decide the values of parameters to invoke an action with, in addition to the incremental approach, the action agent can use a neural network-based approach to learn from previous invocations what the approximate value of the parameters should be. It can then follow the incremental approach from that point.

Relations Between Actions and Learning from the Administrator

In addition to learning the attributes of the actions, patterns can also be derived by recording the relationships between action invocation and trying to derive patterns (e.g., Action A and B are always invoked together, Action C and D nullify each other, etc.).

Learning can also be achieved through monitoring an administrator. When the administrator invokes an action in response to a goal not being met, the system creates a record and records details such as the resource levels, workload characteristics, the value of the goals and the intended action. This record is used to create a "case" and uses existing approaches for Case-based Reasoning (CBR).

Figure 6:
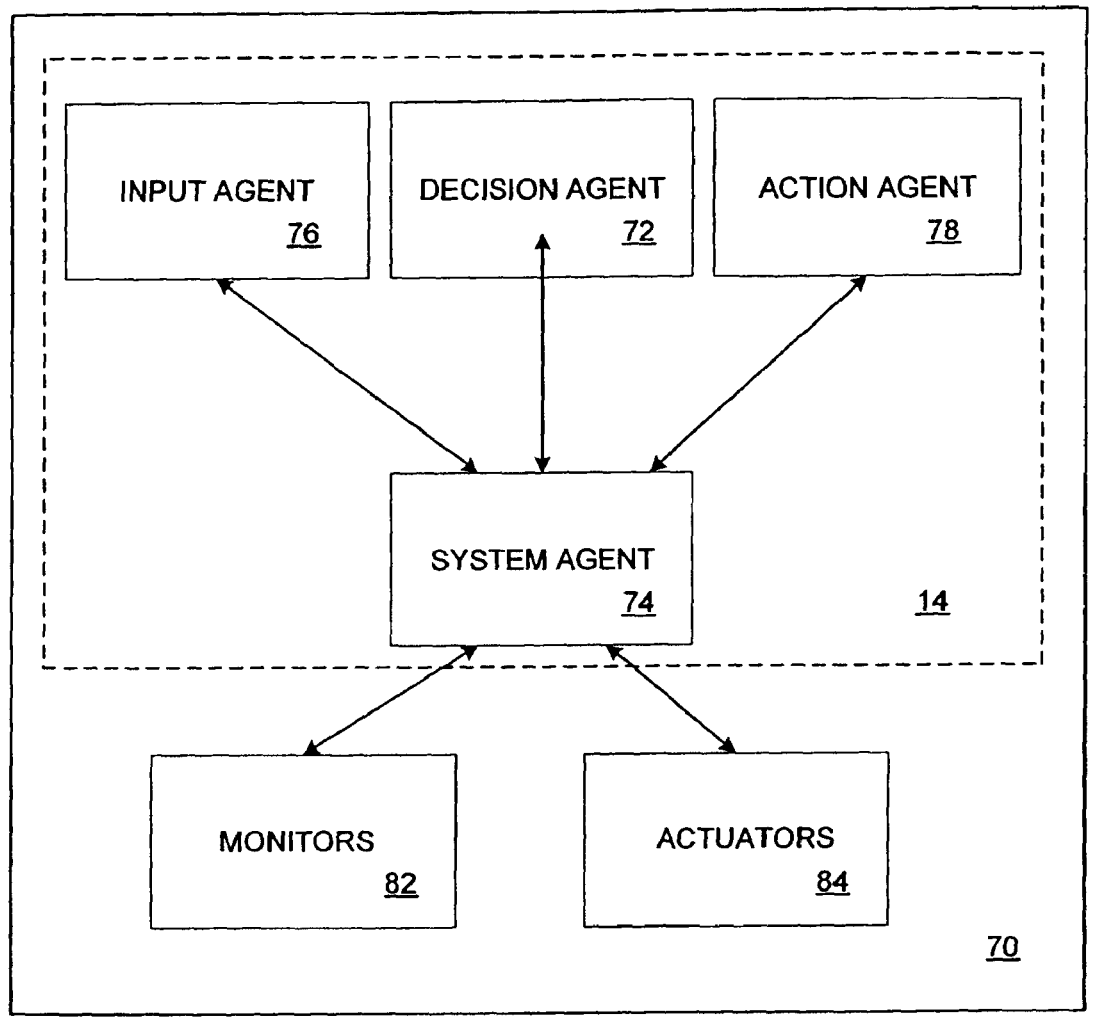
FIG. 6 is a block diagram of a system manager and its interaction with its functionality, according to an exemplary embodiment of the invention.

FIG. 6 is a block diagram 70 of a system manager 14 and its interaction with its functionality (e.g., monitors, actuators, etc.), according to an exemplary embodiment of the invention. The decision making module 72 is implemented through interaction between several component agents. These component agents are described briefly below.

The system agent 74 coordinates communication between all other agents and monitors in the system in order to get the input about action attributes from the administrator and to provide autonomic functionality based on the policy specification. The administrator of the system interacts directly with the system agent 74 as do the monitors and actuators. The system agent 74 uses a poll-model for getting system state. It periodically polls the monitors and updates its state variables. It then checks to see if any goals are violated. If so, then it invokes the decision-making process to rectify the situation.

The input agent 76 is responsible for converting the policy specification provided by the user into some representation in persistent storage. The input agent 76 currently parses the XML specification provided and populates database tables. Storing the action attributes in this form allows for easy retrieval of information when needed as well as for easy update by the manager while learning.

The decision Agent 72 decides which among several possible actions the manager should invoke. To accomplish this, the decision agent 72 uses the meta specification to reason between actions and chooses one or more actions to be invoked in order to return the system to a state where all the goals are met. If no such action exists, then it returns an empty set.

The action agent 78 takes the set of one or more actions generated by the decision agent, and utilizes the base specification to determine the values of the parameters with which to invoke the actions with.

Figure 7:
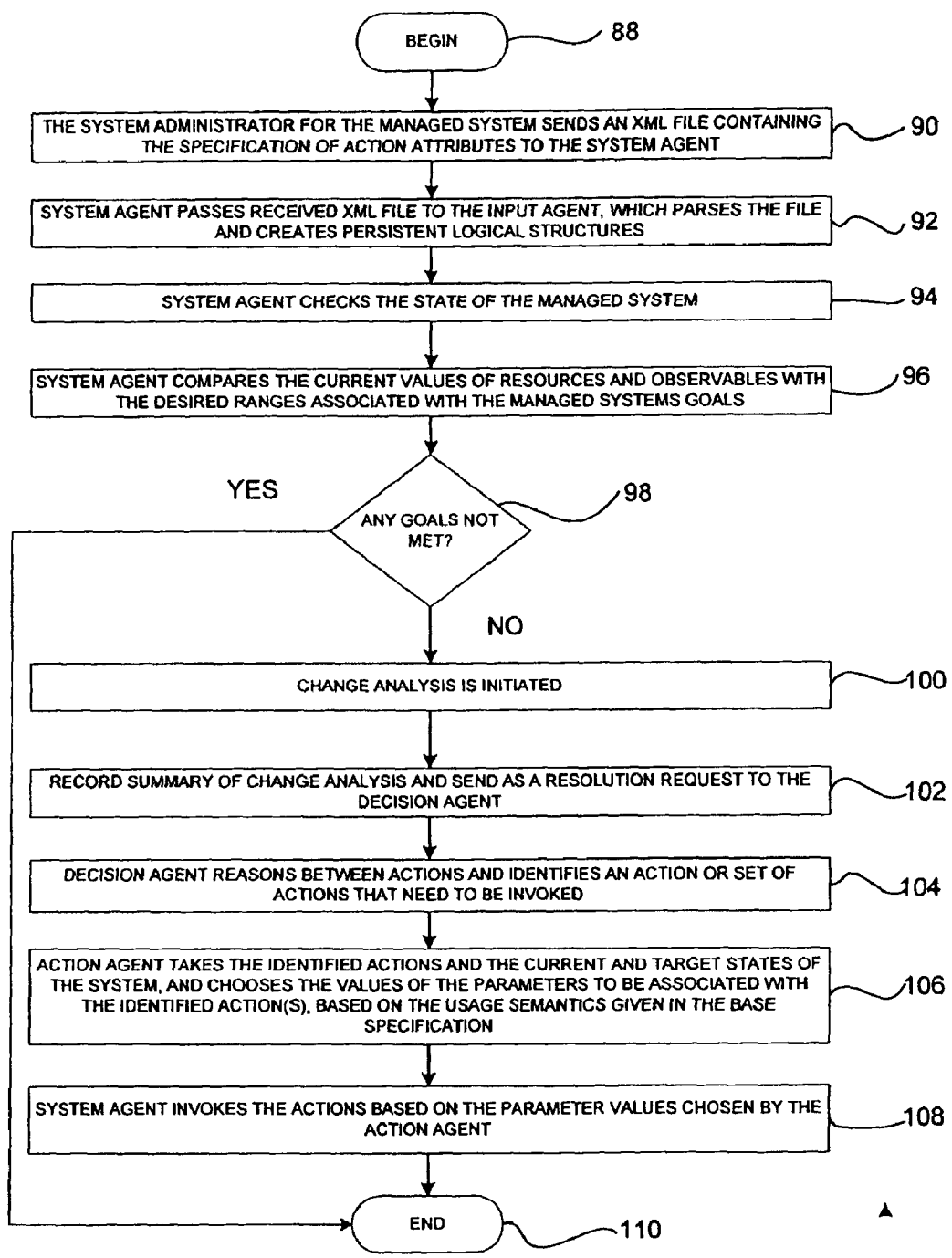
FIG. 7 illustrates a method, of executing an action-centric approach for specification, reasoning and self-learning in a managed system, according to an exemplary embodiment of the invention.

FIG. 7 illustrates a method 86, of executing an action-centric approach for specification, reasoning and self-learning in managed system 12, according to an exemplary embodiment of the invention.

At block 88, method 86 begins.

At block 90, an administrator of the system sends an XML file containing the specification of action attributes to the system agent 74.

At block 92, the system agent 74 in turn passes the request to the input agent 76, which parses the file and creates persistent logical structures. This is done once when managed system 12 is started, and needs to be invoked again only when the action attributes need to be changed, which happens infrequently.

At block 94 the system agent 74 checks the state of the system built from information gathered by monitors. In the exemplary embodiment, this checking is done on a periodic basis by the system agent 74. The periodic basis is a unit of time configurable by an administrator and/or software.

At block 96, the system agent 74 compares the current values of resources and observables with the desired ranges specified in the goals.

At block 98, a determination is made as to whether any of managed system 12 goals are not met. If no, then method 86 ends.

Returning to block 98, if yes, then at block 100 a change analysis to generate an appropriate request is initiated. When one or more goals are not met, the system performs a change analysis, where it summarizes the minimum number changes needed in the values of resources and/or observables in order to bring the system to a state where all goals are met.

At block 102, the summary of the change analysis of block 100 is recorded and sent as a resolution request to decision agent 72.

At block 104, decision agent 72 reasons between actions and chooses an action or a set of actions that need to be invoked.

At block 106, the action agent 78 then takes this set of actions and the current and target states of the system, and chooses the values of the parameters to be associated with the identified action(s), based on the usage semantics given in the base specification.

At block 108, the system agent 74 invokes the actions, based on the parameter values chosen by the action agent 78 at block 106.

At block 110, method 86 ends.

Thus, a system and method to provide autonomic management in a storage system, using an action-centric approach has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for providing autonomic policy management of a networked system, comprising:
    identifying behavior goals associated with the networked system;
    expressing goals as thresholds on values of a set of observables representing properties of a managed system or as thresholds on values of a set of resources used to service requests from applications;
    identifying workload characteristics of the networked system;
    determining resource utilization of the networked system;
    determining whether the identified behavior goals are being met based on the identified workload characteristics and determined resource utilization; and
    autonomically adjust the identified workload characteristics and determined resource utilization in response to a determination that the identified behavior goals are not being met,
    whereby, the autonomic adjustment provides for dynamically adjusting the identified workload characteristics and the determined resource utilization to a level in which the identified behavior goals are being met.

2. A method of deploying a system to provide autonomic management of a networked system using an action-centric approach, comprising:
    evaluating a current management system being utilized to maintain policies in the management of the networked system, wherein the policies identify system actions to be taken in view of the networked system's characteristics;
    determining how to update the current management system with an autonomic management system to manage the networked system, comprising:
        invoking a reasoning procedure when a goal is not met, comprising:
            searching a policy specification to locate adaptation objects whose attributes match system characteristics causing the networked system's identified behavior goals not to be met; and
            deciding which combination of adaptation objects to invoke and the corresponding degree of change; and
    deploying the autonomic management system according to the update determination made,
    whereby updating comprises replacing the current management system with the autonomic management system or integrating the autonomic management system into the current management system.

3. The method of claim 2 wherein system actions comprise meta attributes and base attributes.

4. The method of claim 2 wherein the networked system's characteristics comprise system workload, system resources, system environment and system goals.

5. The method of claim 2 wherein the networked system is a storage area network (SAN).